Figure 1:
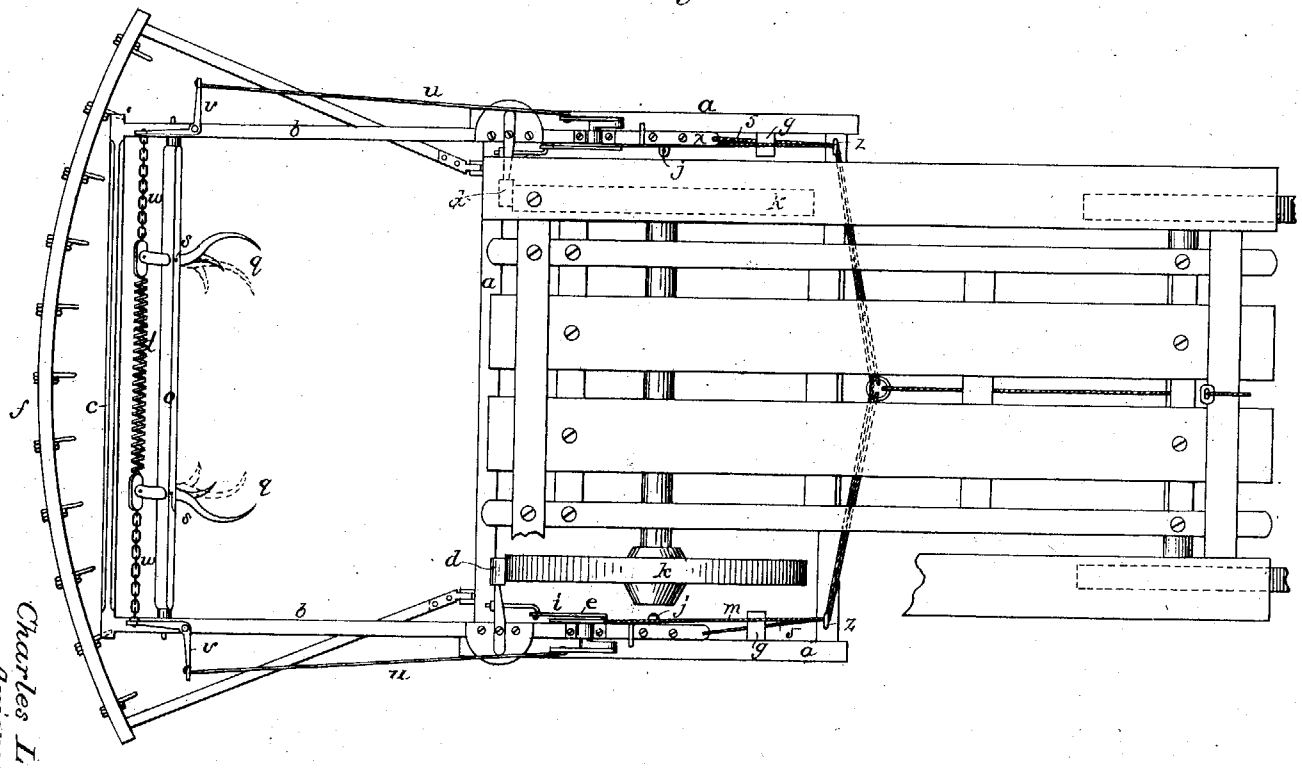

2 Sheets—Sheet 1.

A. VOSE,

Assignor, by mesne assignments, to C. La Dow.

HAY RAKER AND LOADER.

No. 10,164. Reissued July 18, 1882.

Charles La Dow
Assignee of
INVENTOR

Albert Vose,
By his Attorneys
Baldwin, Hopkins, & Peyton.

WITNESSES

Wm A. Skinkle
Wm J. Tanner

N. PETERS, Photo-Lithographer, Washington, D. C.

2 Sheets—Sheet 2.
A. VOSE,
Assignor, by mesne assignments, to C. La Dow.
HAY RAKER AND LOADER.
No. 10,164. Reissued July 18, 1882.
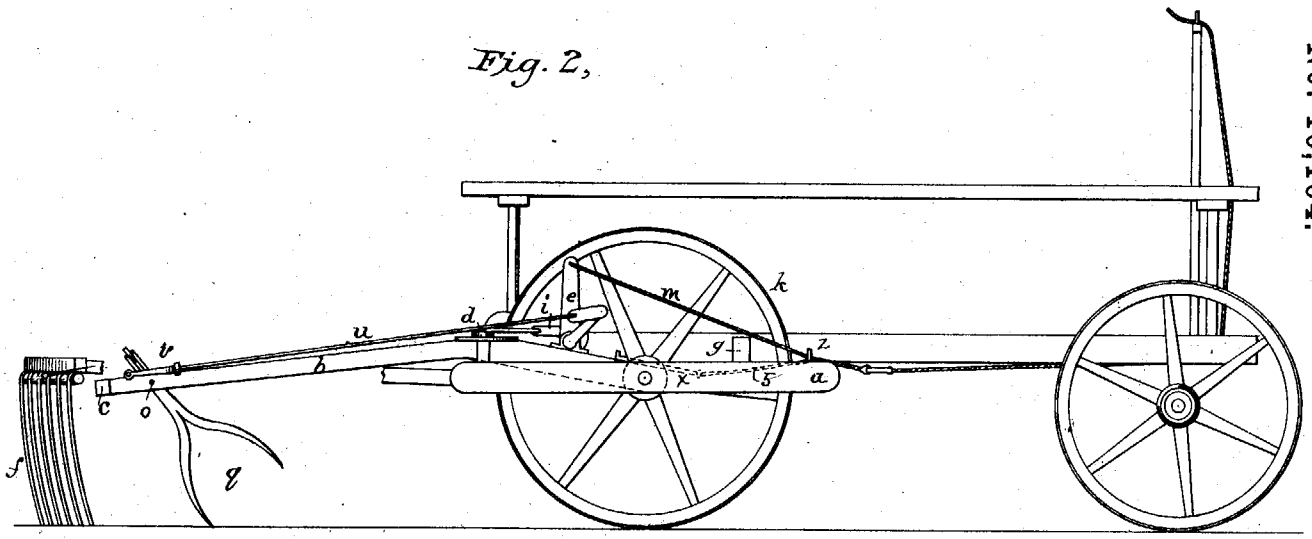
Fig. 2,
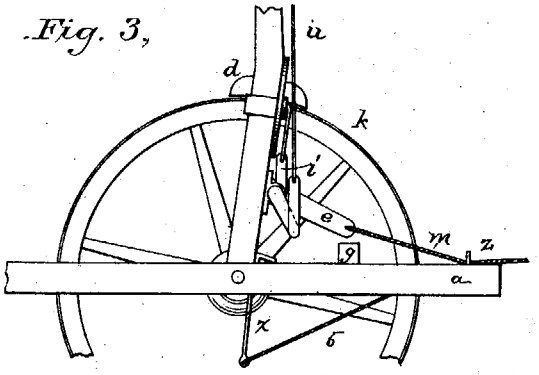
Fig. 3,
WITNESSES
Wm A. Skinkle.
Wm J. Tanner
Charles La Dow
Assignee of
INVENTOR
Albert Vose,
By his Attorneys
Baldwin, Hopkins, & Peyton
N. PETERS, Photo-Lithographer, Washington, D. C.

UNITED STATES PATENT OFFICE.

ALBERT VOSE, OF PITTSFIELD, VERMONT, ASSIGNOR, BY MESNE ASSIGNMENTS, TO CHARLES LA DOW, OF ALBANY, NEW YORK.

HAY RAKER AND LOADER.

SPECIFICATION forming part of Reissued Letters Patent No. 10,164, dated July 18, 1882.

Original No. 72,133, dated December 10, 1867. Application for reissue filed January 7, 1882.

*To all whom it may concern:*

Be it known that I, ALBERT VOSE, of the town of Pittsfield, in the county of Rutland, in the State of Vermont, have invented a new and useful Machine for Loading Hay; and I do hereby declare that the following is a full, clear, and exact description of the construction and operation of the same, reference being had to the annexed drawings, making part of this specification.

The nature of my invention consists in the construction of a machine for loading hay from the windrow, the forks for lifting the hay being carried by two arms or a frame which is pivotally connected with the wagon to which the apparatus is attached, and the power for raising the frame to deposit the hay on the wagon being derived from the rear wheels of the wagon and applied by means of friction-blocks carried by the arms or rocking frame, which blocks are drawn against the wheels by a combination of levers and ropes, and the hay, being gathered by a curved rake, may be loaded very fast, the machine to be managed and controlled by the driver on the load.

To enable others skilled in the art to make and use my invention, I will proceed to describe its construction and operation.

Figure 1 is a plan or top view of a hay-wagon having my improved hay-loader attached, the wagon body or rack being partly broken away for the purpose of more clearly showing the arrangement of the parts of the loading attachment. Fig. 2 is a side elevation of the same; and Fig. 3 is also a side elevation, showing the fork-carrier arms thrown up into a vertical position for loading the hay upon the wagon, as hereinafter explained.

I construct my machine as follows: I attach to any common hay-wagon a square frame of wood (represented by *a a a a*, Fig. 1) to the under side of the body, fastened to it by four iron bolts, the ends of the frame *a a* passing the outside of the rear wheels opposite the ends of the axle. To this I attach the whole machine, so that it may be taken off when desired. To this frame, on the inside, opposite the center of motion of the wheels, I attach the arms *b b*, on each side of the wagon, by a small axle, *j*, made fast in the frame *a a*, so that the center of the motion of the arms *b b* corresponds with that of the wheels *k k*. I connect the outer ends of the arms *b b* by the bar of wood *c*. To each of these arms *b b*, I attach the friction-blocks *d d* with a loose bolt, so that they may be drawn against the wheels by the lever *e*, being connected with it by the rod *i*, the lever *e* being operated by the rope *m*, which is attached to its longest arm and passes down through the rings *z z*, and connects together and passes on the under side of the body and up to the driver's stake, where he can operate it at pleasure. A pull by the driver at rope *m* throws on the friction-blocks *d d*, and also shuts the forks upon the hay by means of the rods *u*, levers *v*, and chains *w*, which connect them with lever *e* and rope *m*. The hay is thus grasped by the forks, and the friction-blocks *d*, being simultaneously applied to the wheels, the arms *b*, upon which said blocks are mounted, turning upon the same center with the wheels, are fastened thereto, and by the rotation of the wheels as the machine is drawn forward are raised past a vertical position, (see Fig. 3,) carrying the loaded fork with them, until the lever *e* strikes the projecting arm or stop *g* and is thrown back, loosening the friction-blocks *d d* and releasing the forks *q q*, which are thrown open by the spring *t*, dropping the hay upon the load, the frame remaining in its elevated position by gravity. I attach the ropes 5 to the arms *x x*, Figs. 1 and 3, for the purpose of throwing back the fork after it is raised. The rope 5 is attached to the rope *m* in such a way that when the fork is up the end of the rope *m*, attached to lever *e*, is slack and rope 5 is tight—that is, the lever *e* moves toward the point from which the rope is pulled, while *x* moves away from it as the frame or arms *b b* are raised. This tightens rope 5 and slackens rope *m*, Fig. 3. Hence a slight pull by the driver throws the fork back upon the hay which is gathered by the rake *f*, and rope 5 is made loose and rope *m* is tight.

I will next describe the forks *q q*, which are attached to the freely-revolving cross-piece *o* by means of the loose bolts *s s*, so as to open and shut upon the hay. The forks *q q* are thrown open by the coil-spring *t*, by which they are connected at the top, and are connected to the right-angled levers *v v* by the chains *w w*. The levers *v v* are connected with the levers *e e* by the rods *u u*, so that when the friction-blocks *d d* are thrown upon the wheels by ropes *m m* the forks *q q* are drawn together and made fast in the hay, there remaining until levers *e e* are thrown back by the blocks *g g*. The rods *u u* and *i i* are so attached to levers *e e* as to form an eccentric, so that when rope *m* pulls them in position to work the fork the friction-block is made fast to the wheel, and the fork will be kept shut until levers *e e* are thrown back by blocks *g g*, as will be seen at Figs. 2 and 3.

The rake *f* is made in a curved form, with spiral teeth, so as to gather the hay to the center, ready for the fork, and is attached to the frame *a a* by the arms *n n* by a loose joint, that may be easily detached, operating just in rear of the fork, thus combining the forks *g g* with a semicircular rake, *f*, to operate substantially as described.

What I claim as my invention, and desire to secure by Letters Patent, is—

1. The combination of lifting-wheels, a rocking frame, a friction device for lifting the frame by the rotation of the wheels, a lever and connections for operating the friction device, and a stop for the lever to strike against for the purpose of loosening the friction, substantially as described.

2. The hay-rake *f*, having its teeth arranged to present a concave or dished front at the side where the hay is accumulated in raking, to gather the hay toward the center, substantially as set forth.

ALBERT VOSE.

Witnesses:
JERREY HAYES,
CHARLES H. WHITLOCK.